United States Patent
Sakamoto

(10) Patent No.: US 7,281,424 B2
(45) Date of Patent: Oct. 16, 2007

(54) ROTATION-SUPPORT APPARATUS WITH ROTATION SENSOR DEVICE FOR DRIVE-WHEEL

(75) Inventor: Junshi Sakamoto, Fujisawa (JP)

(73) Assignee: NSK Ltd., Tokyo (JP)

( * ) Notice: Subject to any disclaimer, the term of this patent is extended or adjusted under 35 U.S.C. 154(b) by 21 days.

(21) Appl. No.: 10/491,957

(22) PCT Filed: Oct. 11, 2002

(86) PCT No.: PCT/JP02/10606

§ 371 (c)(1),
(2), (4) Date: Aug. 13, 2004

(87) PCT Pub. No.: WO03/033277

PCT Pub. Date: Apr. 24, 2003

(65) Prior Publication Data

US 2004/0250619 A1    Dec. 16, 2004

(30) Foreign Application Priority Data

Oct. 16, 2001    (JP)    ............................. 2001-318434

(51) Int. Cl.
*G01P 1/02* (2006.01)
(52) U.S. Cl. ......................... 73/494; 384/448
(58) Field of Classification Search ............... 384/448; 73/494; 464/145, 178
See application file for complete search history.

(56) References Cited

U.S. PATENT DOCUMENTS

| | | | | |
|---|---|---|---|---|
| 4,864,231 A | * | 9/1989 | Okumura et al. | 324/173 |
| 4,881,842 A | * | 11/1989 | Farrell et al. | 403/19 |
| 4,969,694 A | * | 11/1990 | Caron | 303/1 |
| 5,143,458 A | * | 9/1992 | Alff et al. | 384/448 |
| 5,209,701 A | * | 5/1993 | Ishikawa et al. | 464/178 |
| 5,263,366 A | * | 11/1993 | Sakamoto | 73/118.1 |
| 5,547,290 A | * | 8/1996 | Ouchi et al. | 384/448 |
| 5,551,291 A | * | 9/1996 | Morita | 73/494 |
| 5,564,839 A | * | 10/1996 | Ouchi et al. | 384/448 |
| 5,678,933 A | * | 10/1997 | Ouchi et al. | 384/448 |
| 5,762,425 A | * | 6/1998 | Ouchi | 384/448 |
| 5,852,361 A | * | 12/1998 | Ouchi et al. | 324/174 |

(Continued)

FOREIGN PATENT DOCUMENTS

| | | |
|---|---|---|
| EP | 0 371 836 | 6/1990 |
| JP | 62-297530 | 12/1987 |

(Continued)

*Primary Examiner*—Hezron Williams
*Assistant Examiner*—Samir M. Shah
(74) *Attorney, Agent, or Firm*—Crowell & Moring LLP

(57) ABSTRACT

The outer race 2 is fixed to the support hole 29 in the knuckle 1, and the constant velocity joint 6 is connected to the hub 3. The first seal ring 9 is fitted into the outer race 2 to cover the opening on the end of the bearing space 26. The seal ring 28 is fitted into the support hole 29 to cover the opening on the end of the detection space 27. The encoder 7 is fitted onto the inner race 4, and the outer peripheral edge of the encoder 7 faces the inner peripheral surface on the outer race 2 in an adjacent arrangement relationship to form a labyrinth clearance 36, so that grease within the bearing space 26 is prevented from leaking toward the detection space 27, whereby the rotation resistance is small to improve parts of the automobile in acceleration and fuel consumption.

6 Claims, 4 Drawing Sheets

U.S. PATENT DOCUMENTS

| | | | |
|---|---|---|---|
| 5,974,665 A * | 11/1999 | Frielingsdorf et al. | 29/894.361 |
| 6,135,571 A * | 10/2000 | Mizukoshi et al. | 301/105.1 |
| 6,174,088 B1 * | 1/2001 | Miyazaki | 384/448 |
| 6,186,667 B1 * | 2/2001 | Nakamura et al. | 384/448 |
| 6,209,389 B1 * | 4/2001 | Sakamoto et al. | 73/118.1 |
| 6,254,276 B1 * | 7/2001 | Ouchi et al. | 384/448 |
| 6,267,509 B1 * | 7/2001 | Morimura | 384/448 |
| 6,280,093 B1 * | 8/2001 | Ohtsuki et al. | 384/448 |
| 6,375,359 B1 * | 4/2002 | Miyazaki | 384/448 |
| 6,443,622 B1 * | 9/2002 | Webb et al. | 384/448 |
| 6,446,622 B1 * | 9/2002 | Home | 126/39 E |
| 6,800,033 B2 * | 10/2004 | Ouchi | 464/178 |
| 2002/0086736 A1 * | 7/2002 | Ouchi et al. | 464/145 |
| 2003/0122539 A1 * | 7/2003 | Heimann et al. | 324/173 |
| 2004/0061493 A1 * | 4/2004 | Fishburn et al. | 324/173 |

FOREIGN PATENT DOCUMENTS

| | | |
|---|---|---|
| JP | 64-20530 | 1/1989 |
| JP | 03-93265 | 9/1991 |
| JP | 4-7270 | 1/1992 |
| JP | 5-27334 | 4/1993 |
| JP | 7-502824 | 3/1995 |
| JP | 2518086 | 9/1996 |
| JP | 09 021823 | 1/1997 |
| JP | 09 196059 | 7/1997 |
| JP | 09-242766 | 9/1997 |
| JP | 09-304417 | 11/1997 |
| JP | 2575001 | 4/1998 |
| JP | 10-319027 | 12/1998 |
| JP | 11-023596 | 1/1999 |
| JP | 11 023596 | 1/1999 |
| JP | 11-023597 | 1/1999 |
| JP | 11-38027 | 2/1999 |
| JP | 11-183492 | 7/1999 |
| JP | 2000-162222 | 6/2000 |
| JP | 2000-162223 | 6/2000 |
| JP | 2000-211310 | 8/2000 |
| JP | 2000-225930 | 8/2000 |
| JP | 2001-082979 | 3/2001 |
| JP | 2001-180212 | 7/2001 |
| JP | 2001-234928 | 8/2001 |
| JP | 2001-241435 | 9/2001 |
| WO | WO94/10549 | 5/1994 |

* cited by examiner

ROTATION-SUPPORT APPARATUS WITH ROTATION SENSOR DEVICE FOR DRIVE-WHEEL

TECHNICAL FIELD OF THE INVENTION

The rotation-support apparatus with rotation sensor device for drive-wheel of this invention is used to support the drive wheels of an automobile (rear wheels of an FR automobile and RR automobile, front wheels of an FF automobile, and all wheels for a 4WD automobile) such that they rotate freely with respect to the suspension of the automobile, and also to detect the RPM of the drive wheels.

DESCRIPTION OF THE BACKGROUND OF THE INVENTION

In order to control an anti-lock brake system (ABS) or traction-control system (TCS), it is necessary to detect the RPM of the wheels. Therefore, a rotation-support apparatus with rotation sensor device for drive-wheel is necessary in order to support the drive wheels such that they rotate freely with respect to the suspension and to detect the RPM of the drive wheels. Of this kind of rolling-bearing unit with rotation sensor device, an apparatus for measuring the RPM of the drive wheels has been known and disclosed as in Japanese Patent Publication No. Tokukai Hei 9-21823.

FIG. 5 shows the rotation-support apparatus with rotation sensor device for drive-wheel as described in this publication. This rotation-support apparatus with rotation sensor device for drive-wheel comprises: a knuckle 1, outer race 2, hub 3, inner race 4, a plurality of rolling elements 5, constant-velocity joint 6, encoder 7, rotation detection sensor 8, and first to third seal rings 9 to 11.

Of these, the knuckle 1 is part of the suspension and has a support hole 12 for supporting the outer race 2.

Also, the outer race 2 has a double row of outer-ring raceways 13a, 13b formed around its inner peripheral surface and has an outward facing flange-shaped installation section 14 formed around its outer peripheral surface. This outer race 2 is securely fastened with bolts (not shown in the figure) to the knuckle 1, such that part of the outer race 2 which is further on the axially inside than the installation section 14 (the axially inside is the direction toward the center in the width direction when installed in the automobile, or in other words the right side in the drawings, and this will be the same throughout this description) is fitted into the inside of the support hole 12.

Moreover, the hub 3 has a flange 15 formed around its outer peripheral surface on the axially outside end (the axially outside is the side toward the outside in the width direction when installed in the automobile, or in other words the left side in the drawings, and this will be the same throughout this specification) for fastening to and supporting the wheel (drive wheel) (not shown in the figure), and also has a first inner-ring raceway 16 formed around its outer peripheral surface in the axially middle section, a small-diameter stepped section 17 formed on the axially inside end, and a spline hole 18 formed through its center.

The inner race 4 fits around and is fastened to the small-diameter stepped section 17. This inner race 4 has a second inner-ring raceway 19 formed around its outer peripheral surface, and is fitted onto the small-diameter stepped section 17, and the axially outside end surface of the inner race 4 comes in contact with a step surface 20 on the axially outside end of the small-diameter stepped section 17 such that the axially inside end surface protrudes further inward in the axial direction than the axially inside end surface of the hub 3.

A plurality of rolling elements 5 are located between each of the outer-ring raceways 13a, 13b and first and second inner-ring raceways 16, 19, and they support the hub 3 and inner race 4 such that they rotate freely on the radially inside of the outer race 2.

Also, the constant-velocity joint 6 comprises a spline shaft 21 located on the axially outer half, and an outer ring 22 for the constant-velocity joint on the axially inner half. This kind of constant-velocity joint 6 is fastened to the hub 3 by a spline joint between the spline shaft 21 and the spline hole 18, and by tightening a nut 23 around the tip end (axially outer end) portion of the spline shaft 21 that protrudes from the spline hole 18 such that torque can be transmitted to the hub 3. Also, in this state, the axially inside end surface of the inner race 4 comes in contact with the axially outside end surface of the outer ring 22 of the constant-velocity joint, so that this prevents the inner race 4 from separating from the small-diameter section 17 and applies a pre-load to the rolling elements 5.

The encoder 7 is formed out of magnetic metal plate into a circular ring shape having an L-shaped cross section, and its characteristics on the axially inside surface change alternately at equal intervals around in the circumferential direction, and it is supported and fastened on the axially inside end of the inner race 4.

The rotation detection sensor 8 is fastened to the outer race 2 with a circular cover 25 such that the detection portion of the rotation detection sensor 8 is close to and faces the axially inside end surface of the encoder 7.

Furthermore, of the first to third seal rings 9 to 11, the first seal ring 9 comprises a metal core and seal lips, and when the metal core is fitted into and supported by the axially outer end of the outer race 2, the seal lips come in sliding contact around the outer peripheral surface in the axially middle section of the hub 3. Moreover, the second seal ring 10 as well comprises a metal core and seal lips, and when the metal core is fitted into and supported by the axially inside end of the outer race 2, the seal lips come in sliding contact on the outer peripheral surface of the base end of the encoder 7 that is fitted around the axially inside end of the inner race 4. Furthermore, the third seal ring 11 is made entirely of an elastic material, and in the state where the base end of the third seal ring 11 is fastened around the inner peripheral edge of the cover 25, the tip end of the third seal ring 11 comes in sliding contact with the outer peripheral surface of a bell-shaped outer diameter portion 46 of the outer ring 22 for the constant-velocity joint.

In the case of the prior art rotation-support apparatus with rotation sensor device for drive-wheel constructed as described above, the drive wheel that is fastened to the hub 3 is supported such that it rotates freely with respect to the knuckle 1 to which the outer race 2 is fastened, and so it is possible to drive and rotate the drive wheel by way of the constant-velocity joint 6. Also, the rotation-detection sensor 8 faces the axially inside surface of the encoder 7 that is fixed to the hub 3 by way of the inner race 4, and when the hub 3 rotates together with the drive wheel, the output of the rotation-detection sensor 8 changes. The frequency at which the output of this rotation-detection sensor 8 changes is proportional to the RPM of the drive wheel. Therefore, by inputting the signal that is output from the rotation-detection sensor 8 to a controller (not shown), it is possible to find the RPM of the drive wheel and to properly perform ABS or TCS control.

Also, since the first and second seal rings 9, 10 seal the bearing space 26 inside the bearing where the rolling elements 5 are located from the outside, it is possible to prevent foreign matter on the outside from getting inside the bearing space 26 and it is also possible to prevent grease inside the bearing space 26 from leaking to the outside. Furthermore, since the second seal ring 10 seals the bearing space 26 from the detection space 27, in which the encoder 7 and rotation-detection sensor 8 are stored, and the third seal ring 11 seals this detection space 27 from the outside, no foreign matter or grease gets inside the detection space 27.

In the case of the prior art construction described above, the first to third seal rings 9 to 11, which form contact-type seals, seal the bearing space 26 and detection space 27 from the outside, and also seal the both spaces 26, 27 from each other. The surface pressure at the area of contact between the edges of the elastic seal lips of the first to third seal rings 9 to 11 and the opposing surfaces is low, however since the length of the contact area is long, the friction resistance at the area of contact cannot be ignored. Therefore, the increase of the rotation resistance of the rotation-support apparatus with rotation sensor device for drive-wheel due to the first to third seal rings 9 to 11 becomes large enough that it cannot be ignored. This increase in rotation resistance becomes the cause of lowered performance of the automobile, mainly the acceleration performance and fuel-consumption performance, and is not desirable.

DISCLOSURE OF THE INVENTION

The rotation-support apparatus with rotation sensor device for drive-wheel of this invention was invented to solve the problems described above.

Similar to the prior art rotation-support apparatus with rotation sensor device for drive-wheel described above, the rotation-support apparatus with rotation sensor device for drive-wheel of this invention comprises: a knuckle, outer race, hub, inner race, plurality of rolling elements, constant-velocity joint, encoder, rotation-detection sensor and seal ring.

Of these, the knuckle is part of the suspension apparatus and has a support hole.

Also, the outer race has a double row of outer-ring raceways formed around its inner peripheral surface, and with at least part of it inserted into the support hole, it is fastened to and supported by the knuckle.

Also, the hub has a flange formed around its outer peripheral surface on the axially outer end for fastening to and supporting the wheel, a first inner-ring raceway formed directly or by way of a separate inner race around its outer peripheral surface in the axially middle section, a small-diameter stepped section formed on the axially inside end and a spline hole formed in the center.

Also, the inner race has a second inner-ring raceway formed around its outer peripheral surface and it is fitted onto the small-diameter section.

Also, the plurality of rolling elements are located between each of the rows of outer-ring raceways and first and second inner-ring raceways.

Also, the constant-velocity joint is fastened to the hub by a spline joint between the shaft formed on the axially outer half and the spline hole such that torque can be transmitted to the hub.

Also, the encoder is fastened to and supported by the axially inside end of the inner race, which has the second inner-ring raceway, and the characteristics, or in other words, characteristics selected from the magnetic characteristics, electric characteristics, or optical characteristics, on the axially inside surface alternately change around in the circumferential direction.

Also, the detection section of the rotation-detection sensor faces the axially inside surface of the encoder.

Furthermore, the seal ring is located further axially inside than the rotation-detection sensor and covers the gap between the knuckle and constant-velocity joint.

Particularly, in the case of the rotation-support apparatus with rotation sensor device for drive-wheel of this invention, by inserting the rotation-detection sensor into an installation hole that is formed in part of the knuckle, it is supported by part of the knuckle that is further inward in the axial direction than the axially inside end surface of the outer race.

Also, by making at least one of the outer peripheral edge of the encoder and the area near the outer periphery of the encoder come close to and face at least one of the inner peripheral surface of the outer race and the axially inside end surface of the outer race, a labyrinth seal is formed between the outer race and the encoder.

The functions of the rotation-support apparatus with rotation sensor device for drive-wheel of this invention, constructed as described above, of supporting the drive wheel such that it rotates freely with respect to the suspension, driving and rotating the drive wheel and detecting the RPM of the drive wheel are substantially the same as those in the case of the prior construction described above.

Particularly, in the case of the rotation-support apparatus with rotation sensor device for drive-wheel of this invention, the bearing space in which the plurality of rolling elements are located, and the detection space in which the encoder and rotation-detection sensor are located, are sealed by a non-contact type labyrinth seal, so resistance to rotation of the drive wheel is suppressed small. The seal between the bearing space and detection space is necessary for preventing the grease, used for lubricating the rolling contact area between the rolling contact surface of the rolling elements and the raceways that are located inside the bearing space, from leaking, and for maintaining the amount of grease inside the bearing space and maintaining durability of the rolling bearing.

DESCRIPTION OF THE BEST EMBODIMENT TO WORK THE INVENTION

Figure 1:
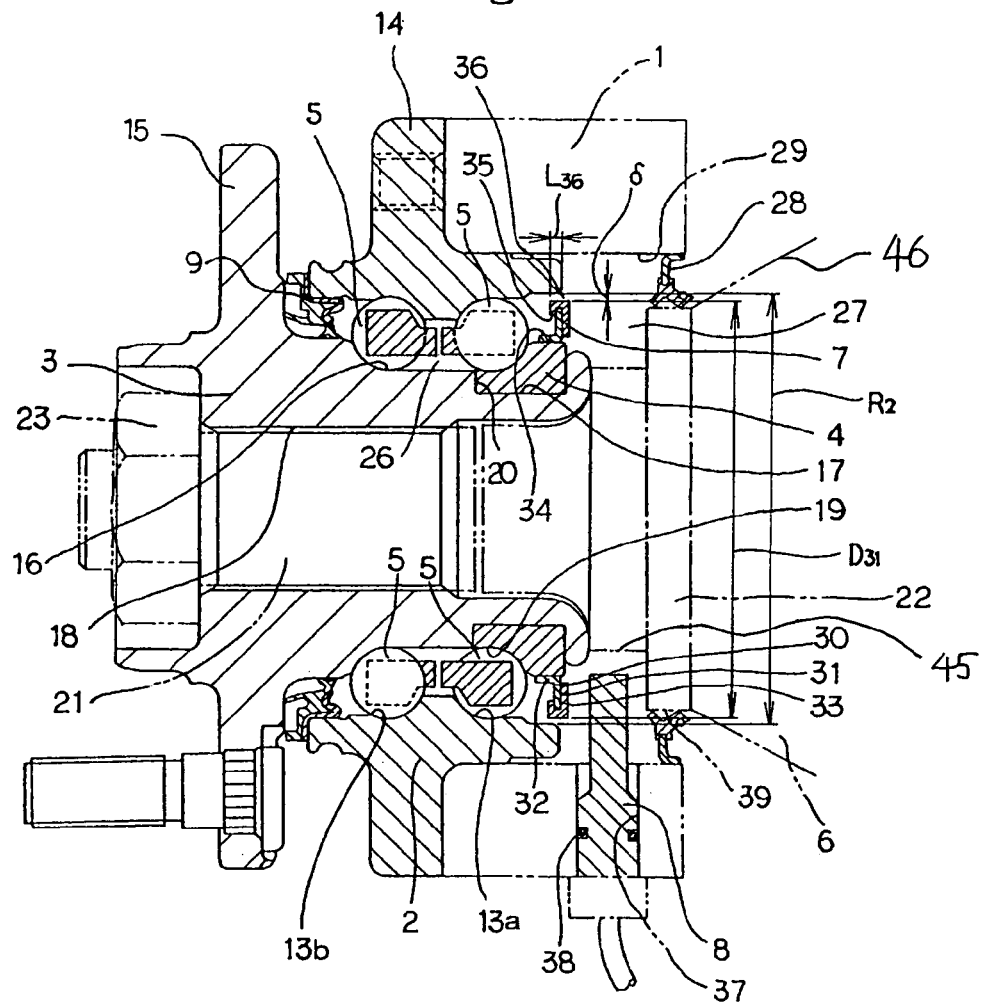
FIG. 1 is a cross sectional view to show a first example of the embodiment of the present invention.

Now, the present invention is further explained referring to the attached drawings, wherein the same reference numerals are attached to the like members.

Figure 2:
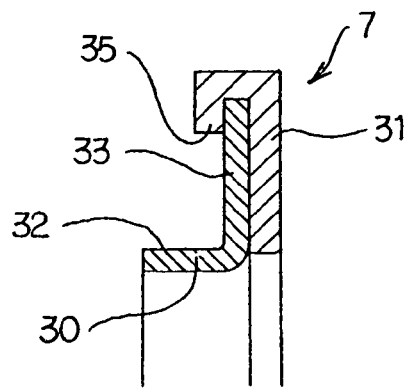
FIG. 2 is a partial cross sectional view to show an encoder only.

FIG. 1 and FIG. 2 show a first example of the embodiment of the present invention. The rotation-support apparatus with rotation sensor device for drive-wheel of this example comprises: a knuckle 1, outer race 2, hub 3, inner race 4, plurality of rolling elements 5, constant-velocity joint 6, encoder 7, rotation-detection sensor 8, first seal ring 9 and separate seal ring 28.

Of these, the knuckle 1 is part of the suspension and has a circular support hole 29. Also, the outer race 2 has a double row of angular-type outer-ring raceways 13 formed around its inner peripheral surface, and has an outward facing flange-shaped installation section 14 formed around its outer peripheral surface. The outer race 2 is fastened to the knuckle 1 by securely fitting the part that is further on the axially inside than the installation section 14, inside the support hole 29, and then further tightening it with bolts (not shown in the figure) that are screwed into screw holes formed in the installation section 14.

Moreover, the hub 3 has a flange formed around its outer peripheral surface on the axially outside end for fastening to and supporting the vehicle wheel, a first inner-ring raceway 16 that is formed directly around the outer peripheral surface in the axially middle section, a small-diameter stepped section 17 that is formed on the axially inside end, and a spline hole 18 that is formed through its center. Also, the inner race 4 has a second inner-ring raceway 19 formed around its outer peripheral surface, and in the state where the inner race 4 is fitted around the small-diameter stepped section 17 of the hub 3 with the axially outside end surface of the inner race 4 brought in contact with the step surface 20 on the axially outside end surface of the small-diameter stepped section 17, the axially inside end surface of the inner race 4 protrudes further inward in the axial direction than the axially inside end surface of the hub 3. Also, the rolling elements 5 are located between each of the rows of outer-ring raceways 13$a$, 13$b$ and first and second inner-ring raceways 16, 19, so as to support the hub 3 and inner race 4 such that they rotate freely on the radially inside of the outer race 2.

The constant-velocity joint 6 comprises a spline shaft 21 that is formed on the axially outer half, and an outer ring 22 for the constant-velocity joint that is formed on the axially inner half. This constant-velocity joint 6 is fastened to the hub 3 by forming a spline joint between the spline shaft 21 and spline hole 18, and then tightening a nut 23 on the section on the tip end (axially outside end) of the spline shaft 21 that protrudes from the spline hole 18 such that torque can be transmitted to the hub 3. In this state, the axially inside end surface of the inner race 4 comes in contact with the axially outside end surface of the outer ring 22 for the constant-velocity joint, so as to prevent the inner race 4 from separating from the small-diameter section 17 and to apply a pre-load to the rolling elements 5.

In this state, as shown in FIGS. 1-4, the outer ring 22 for the constant-velocity joint projects from the axial inside end of the spline hole 18. The outer ring 22 for the constant-velocity joint includes a first cylindrical outer diameter portion 45, a second cylindrical outer diameter portion (shoulder portion) 39 and a bell-shaped outer diameter portion 46. The first cylindrical outer diameter portion 45 is adjacent to the axial inside end of the spline hole and has a larger diameter than the spline shaft 21. The second cylindrical outer diameter portion is located axially inward of the first cylindrical outer diameter portion and has a larger diameter than the first cylindrical outer diameter portion. The bell-shaped outer diameter portion is located axially inward of the second cylindrical outer diameter portion.

The encoder 7 is formed generally into a circular shape by combining a metal core 30 and rubber magnet 31. Of these, the metal core 30 is formed generally into a circular shape having an L-shaped cross section by performing plastic processing such as pressing of magnet metal plate such as carbon steel plate like SPCC, such that it has a cylindrical section 32 and a circular section 33 that is formed by bending the axially inside end of the cylindrical section 32 outward in the radial direction at a right angle. Also, the rubber magnet is made from a rubber material in which ferromagnetic powder such as ferrite power is mixed, and it is formed generally into a circular shape having a J-shaped cross section such and magnetized in the axial direction. Moreover, magnetic orientation is changed in the circumferential direction alternately with uniform intervals. Accordingly, the S-pole and N-pole are alternated at equal intervals around the axially inside surface of the rubber magnet 31.

The rubber magnet 31 is applied to the circular section 33 such that it covers nearly entirely the axially inside surface of the circular section 33, generally the outer peripheral edge of the circular section 33 and the outer-diameter portion of the axially outside surface of the circular section 33 along the whole circumference, respectively.

The method used for applying the rubber magnet 31 to the circular section 33 can be a method that utilizes the magnetic force and elasticity of this rubber magnet 31 or any suitable method such as adhesive, molding or the like. Of these, setting the metal core 30 into the cavity of an injection mold and applying the rubber magnet 31 by injection molding is preferred since it is possible to form the rubber magnet 31 and assemble it with the metal core 30 at the same time. In the case of any method used, the portion of the axially outside surface of the circular section 33 that is further inward in the radial direction than the rubber magnet 31, is a ring-shaped indented section 35 that indents inward in the axial direction. This ring-shaped indented section 35 functions as a grease catch, to be described later, and serves the purpose of preventing the grease inside the bearing space 26, where the rolling elements 5 are located, from leaking toward the detection space 27, where the rotation-detection sensor 8, also to be described later, is located.

This encoder 7 is fastened to the inner race 4 by tightly fitting the cylindrical section 32 of the metal core 30 around a shoulder 34 that is formed on the axially inside end of the inner race 4. In this state, the outer peripheral edge of the rubber magnet 31 is close to and faces the inner peripheral surface on the axially inside end of the outer race 2. Therefore, the outer diameter $D_{31}$ of the rubber magnet 3 is a little smaller (for example 2 mm or less) than the inner diameter $R_2$ of the axially inside end of the outer race 2 ($0$ mm$<R_2-D_{31}\leq 2$ mm), and the rubber magnet 31 is located such that it is concentric with the outer race 2. Therefore, a labyrinth clearance 36, having a width $\delta$ in the radial direction that is 1 mm or less, is formed all the way around the circumference between the outer peripheral edge of the rubber magnet 31 and the inner peripheral surface on the axially inside end of the outer race 2.

The rotation-support apparatus of this invention receives a large load during operation so, even though the rubber magnet 31 and outer race 2 are arranged such that they are concentric when assembled, when a load is applied, the rubber magnet 31 and outer race 2 become eccentric, and the width $\delta$ of the labyrinth clearance 36 is not uniform around the circumference. The value of the width $\delta$ is set such that even in this case the width $\delta$ does not become '0' anywhere.

As will be described later, this labyrinth clearance 36 serves the purpose of preventing the grease that is inside the bearing space 26 from leaking toward the detection space 27. The length $L_{36}$ of this labyrinth clearance 36 is equal to the amount of overlap of the outer peripheral edge of the rubber magnet 31 and the inner peripheral surface on the axially inside end of the outer race 2, and from the aspect of providing a good seal, the larger it is the better, however, due to size restrictions, in the case of this example it is about 0.8 to 2 mm. Taking this into consideration, in order to secure the length $L_{36}$ in the axial direction to improve the seal, it is possible to form an eave-shaped (short cylindrical-shaped) protrusion that protrudes outward in the axial direction from the outer peripheral edge of the rubber magnet 31 within a range that does not interfere with the rolling elements 5.

There is a chamfered section on the inner peripheral edge of the axially inside end of the outer race 2, however, in any case, it is preferred that the axially outside end of the outer peripheral edge of the rubber magnet 31 extend to the cylindrical surface section that is further outward in the axial direction than the chamfered section. As will be described later, the reason for this is so that it is difficult for the centrifugal force that acts on the grease that enters the labyrinth space 36 to become a force that cause the grease to flow toward the detection space 27.

The rotation-detection sensor 8 is inserted into the installation hole 37 that is formed in part of the knuckle 1, to be supported by the part of the knuckle 1 that is further toward the inside in the axial direction than the axially inside end surface of the outer race 2. The installation hole 37 is formed in the cylindrical portion of the knuckle 1 such that it penetrates that portion in the radial direction. When the rotation-detection sensor 8 is inserted into this installation hole 37 from the outer peripheral surface of the knuckle 1 toward the inner peripheral surface, the detection unit that is located on the tip end (the top end in FIG. 1) of the rotation-detection sensor 8 comes close to and faces the axially inside surface of the rubber magnet 31 through a minute clearance therebetween.

There is an O-ring 38 attached around a portion of the axially middle portion of the rotation-detection sensor 8 that is located inside the installation hole 37, and it prevents foreign matter such as rain water from going through the minute clearance between the outer peripheral surface of the rotation-detection sensor 8 and the inner peripheral surface of the installation hole 37 and into the detection space 27.

The first seal ring 9 has a metal core and seal lips, and when the metal core is fitted inside and supported by the axially outside end of the outer race 2, the seal lips come into sliding contact with the outer peripheral surface around the axially middle section of the hub 3. The first seal ring 9 covers the opening on the axially outside end of the bearing space 26, and together with making it possible to prevent foreign matter from getting into the bearing space 26, it makes it possible to prevent the grease inside the bearing space from leaking out. Furthermore, the seal ring 28 has a metal core and seal lips, and when the metal core is securely fitted inside and fastened by way of interference fit to the axially inside end of the support hole 29, the seal lips come into sliding contact all the way around in the circumference with the second cylindrical outer diameter portion (shoulder section) 39 of the outer ring 22 of the constant-velocity joint 6. In other words, the seal ring 28 covers the gap between the knuckle 1 and the constant-velocity joint 6 in the area further inward in the axial direction than the rotation-detection sensor 8, and it prevents foreign matter such as rainwater from getting inside the detection space 27.

In the case of the rotation-support apparatus with rotation sensor device for drive-wheel of this example constructed as described above, it is possible to support the drive wheel fastened to the hub 3 such that it rotates freely with respect to the knuckle 1 to which the outer race 2 is fastened, and it is also possible to drive and rotate the drive wheel by way of the constant-velocity joint 6.

Moreover, the rotation-detection sensor 8 faces the axially inside surface of the encoder 7 that is fastened to the hub 3 by way of the inner race 4, and as the hub 3 rotates together with the drive wheel, the output of the rotation-detection sensor 8 changes. The frequency at which the output of this rotation-detection sensor 8 changes is proportional to the RPM of the drive wheel. Therefore, by inputting the output signal from the rotation-detection sensor 8 to a controller (not shown in the figures), it is possible to find the RPM of the drive wheel and thus it is possible to perform adequate ABS or TCS control.

In the case of this example, an encoder having a rubber magnet 31 was used as the encoder 7, and an active-type sensor having a magnet-detection element, whose characteristics change according to the direction of the magnetic flux, was used as the rotation-detection sensor 8, so even when the drive wheel rotates even at low speed, it is possible to accurately detect the RPM of the drive wheel.

Furthermore, in the case of the rotation-support apparatus with rotation sensor device for drive-wheel of this embodiment, the bearing space 26, where the plurality of rolling elements 5 are located, and the detection space 27, where the encoder 7 and rotation-detection sensor 8 are located, are sealed by a non-contact labyrinth seal, so it is possible to keep resistance to the rotation of the drive wheel to a minimum. Particularly, in the case of this example, together with forming a ring-shaped indented section 35 around the axially outside surface of the encoder 7, the labyrinth clearance 36 of the labyrinth seal is formed between the inner peripheral surface of the axially inside end of the outer race 2 and the outer peripheral surface of the rubber magnet 31, so it is possible to obtain a good seal performance even with a non-contact type seal. This will be explained in more detail below.

First, the ring-shaped indented section 35 functions to resist against the movement of the grease that has reached the axially outside surface of the encoder 7, specifically to prevent that grease from moving outward in the radial direction due to centrifugal force. As a result, it is possible to keep the amount of grease that reaches the labyrinth clearance 36 to a minimum and contribute to preventing the grease from leaking. Moreover, since the rubber magnet 31 divides the inner periphery side of the labyrinth clearance 36, it is possible to strictly control the dimensions of the inner diameter of the labyrinth clearance 36. That is, it is possible to form the labyrinth seal by having the outer peripheral edge of the metal core 30 come close to and face the outer peripheral surface on the axially inside end of the outer race 2, however, not only is it difficult to increase the dimensions in the axial direction of the outer peripheral edge of the metal core 30, but it is not possible to control the precision of the dimensions and shape of this outer peripheral edge as strictly as the precision of the dimensions and shape of the outer peripheral surface of the rubber magnet 31. In other words, it is easy to secure the dimensions in the axial direction of the outer peripheral surface of the rubber magnet 31 and it is possible to strictly control the precision of the dimensions and shape of this outer peripheral surface, so it is possible to obtain a stable labyrinth seal having excellent seal characteristics.

Furthermore, since the labyrinth clearance 36 exists in the axial direction, even when centrifugal force acts on grease that may get inside the labyrinth clearance 36, this centrifugal force will not act in a direction that will force the grease outside of the bearing space 26. Therefore, supposing grease gets inside the labyrinth clearance 36, it is difficult for the grease to flow from the bearing space 26 to the detection space 27, and thus the labyrinth seal is very effective in preventing the grease from leaking.

Figure 3:
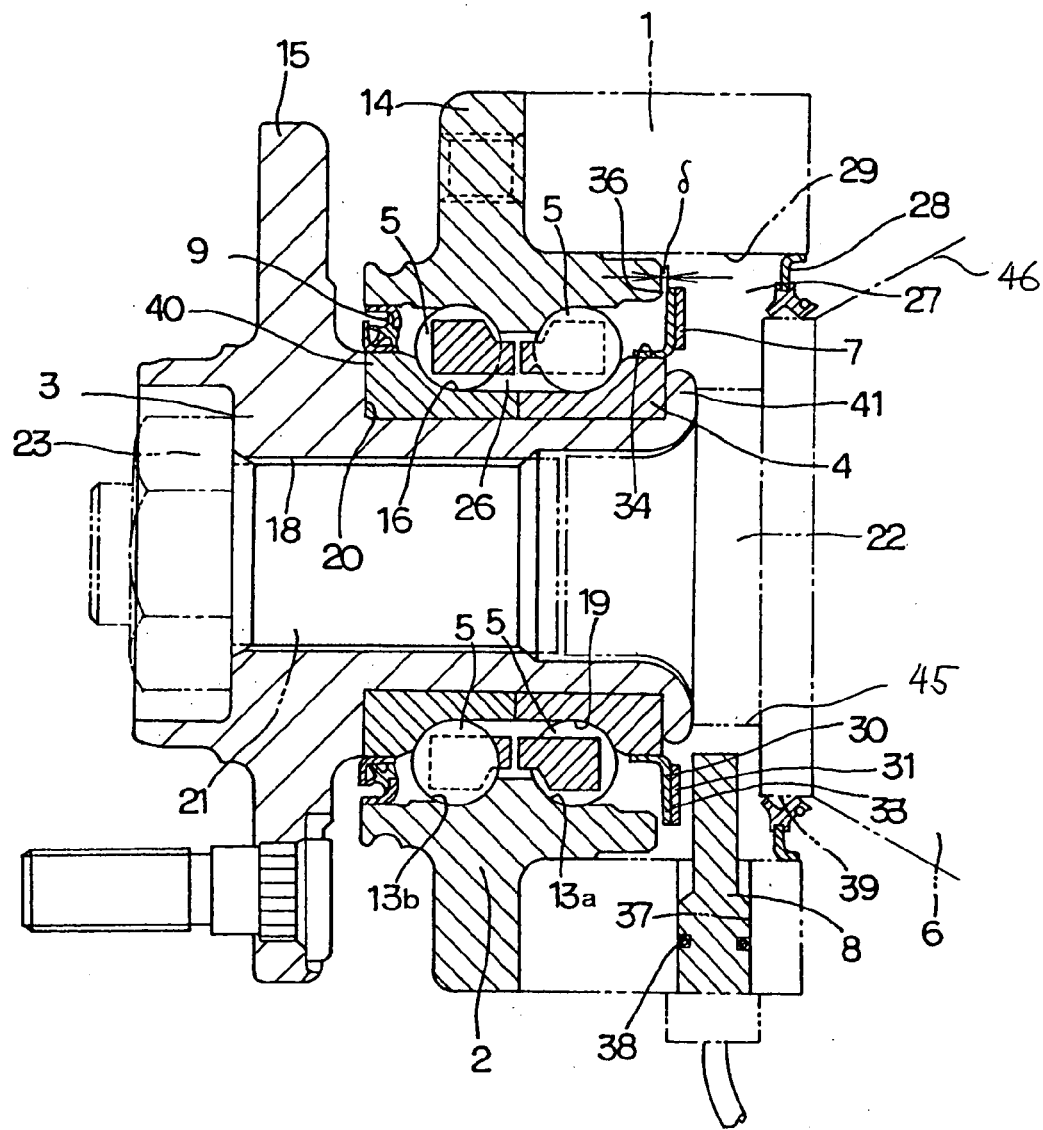
FIG. 3 is a cross sectional view to show a second example of the embodiment of the present invention.

Next, FIG. 3 shows a second example of the embodiment of the present invention. In the case of this example, a separate inner race 40, having a first inner-ring raceway 16 formed around its outer peripheral surface, is fitted around the axially middle section of the hub 3, and an inner race 4, having a second inner-ring raceway 19 formed around its outer peripheral surface, is fitted around the axially inside end of the hub 3, and in the state, both of the inner races 40, 4 are fastened to the hub 3 by crimped section 41 that is formed on the inside end of the hub 3. Also, a combined seal ring is used as the first seal ring 9 that covers the opening on the axially outside end of the bearing space 26.

Also, in the case of this example, an encoder 7 comprises a metal core 30 having a circular ring section 33 and a ring-shaped rubber magnet 31 applied to only the axially inside surface of the circular section 33. Also, by having the outer diameter section on the axially outside surface of the circular section 33 come close to and face the axially inside end surface of the outer race 2, a labyrinth clearance 36 is formed between both of these surfaces having a width δ in the axial direction that is 1 mm or less. In the case of this embodiment, the centrifugal force that acts on the grease that may get inside this labyrinth clearance 36 forces the grease from the bearing space 26 to the detection space 27, so a decrease in the performance of the seal as compared to that of the first example is unavoidable. However, since resistance to the rotation of the drive wheel is kept to a minimum, it can be sufficiently used depending on the application. The construction and function of the other parts are substantially the same as those of the first embodiment, so the same code numbers are used for like parts and any redundant explanation is omitted.

Figure 4:
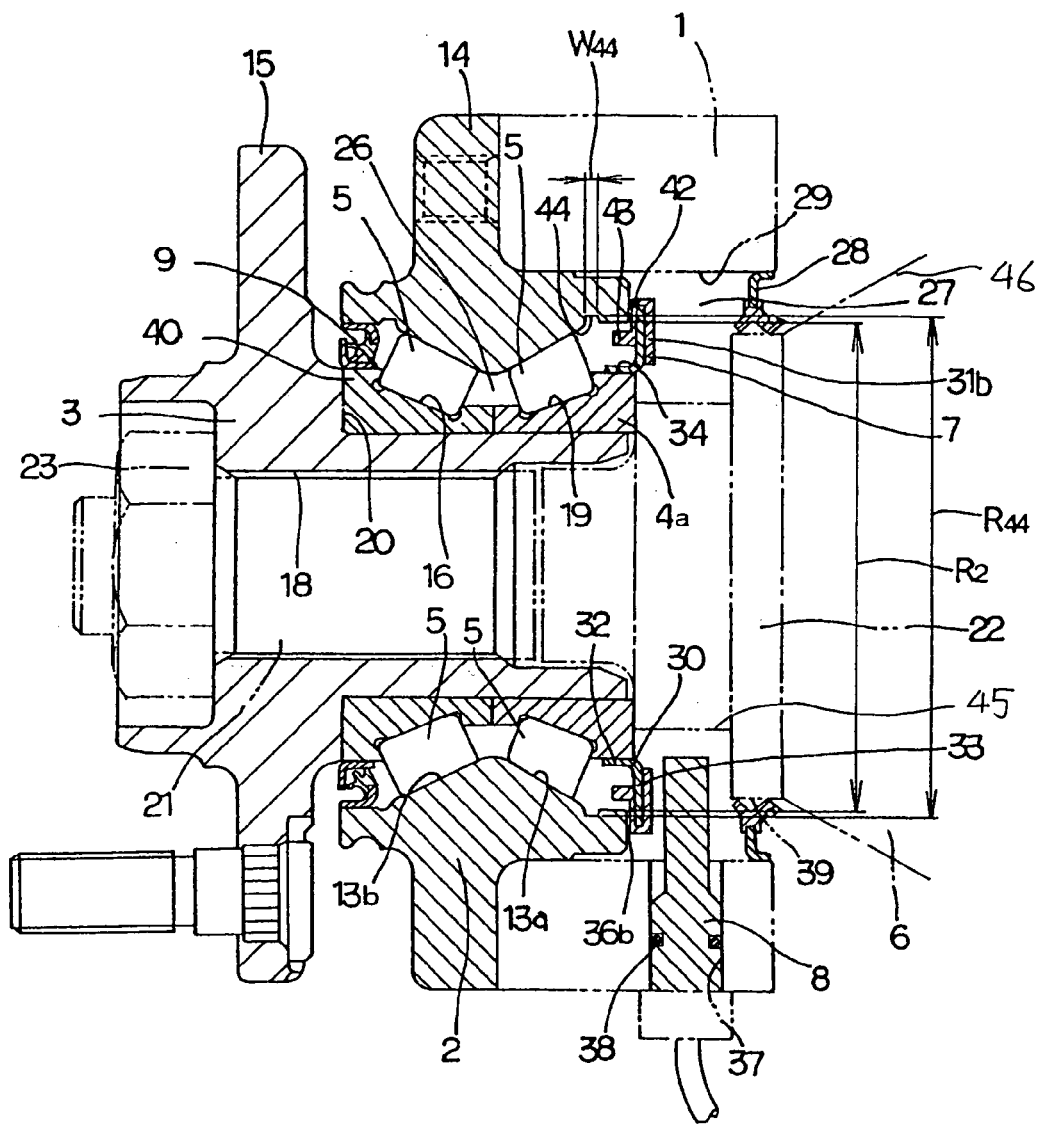
FIG. 4 is a cross sectional view to show a third example of the embodiment of the present invention.
Figure 5:
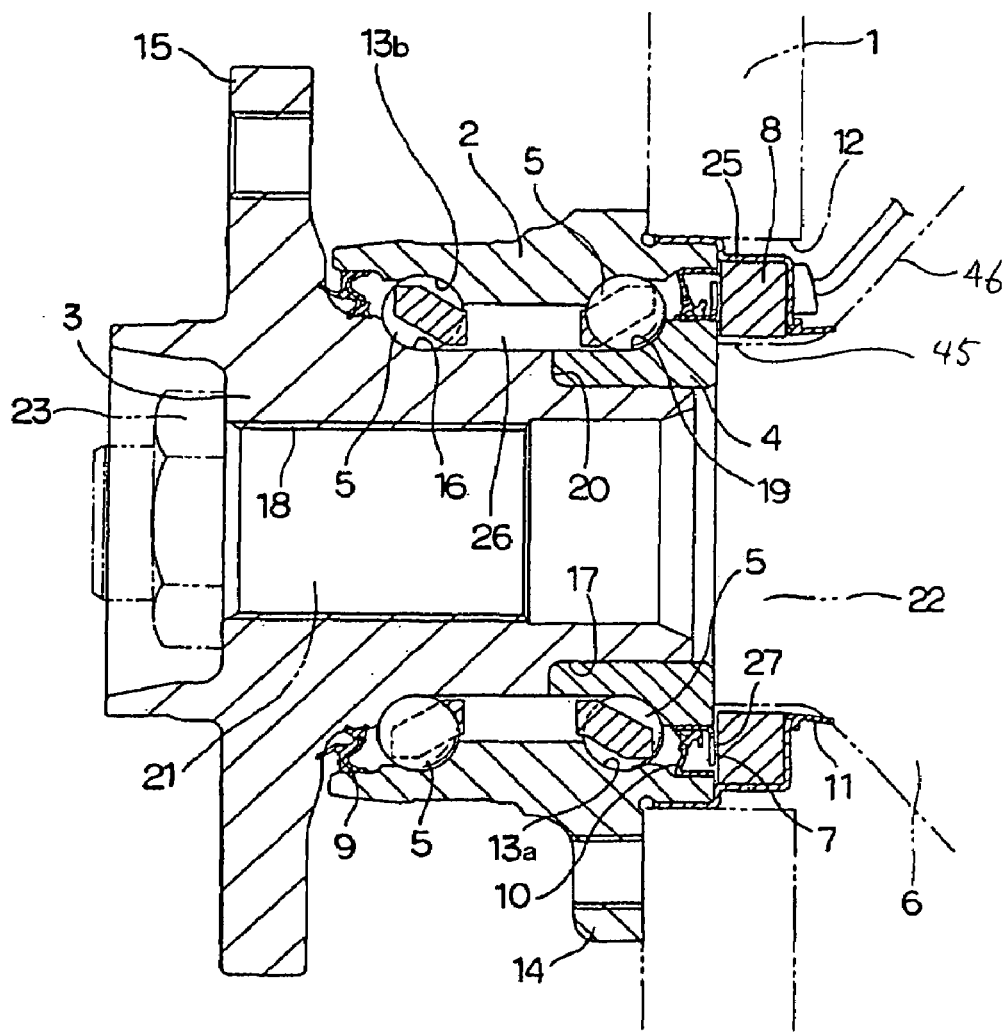
FIG. 5 is a cross sectional view to show an example of the conventional structure.

Next, FIG. 4 shows a third example of the embodiment of the present invention. This example shows the case when the present invention is applied to a double-row tapered-roller bearing unit. Therefore, in the case of this example, the rows of outer-ring raceways 13a, 13b have concave tapered surfaces that are inclined such that the inner radius becomes smaller in the direction toward each other, the first and second inner-ring raceways 16, 19 have convex tapered surfaces that are inclined such that the outer radius becomes smaller in the direction toward each other, and the roller elements 5 are tapered rollers. The first and second inner-ring raceways 16, 19 are formed around the outer peripheral surface of inner races 40, 4 that are each separate from the hub 3. When the rotation-support apparatus with rotation sensor device for drive-wheel is assembled, the inner races 40, 4 are held between the axially outside end surface of the outer ring 22 of the constant-velocity joint 6, and the step surface 20 that is formed around the outer peripheral surface in the axially middle section of the hub 3.

Also, in the case of this example, a labyrinth clearance 36, that bends such that it has an L-shaped cross section, is formed between the bearing space 26 and detection space 27. Here, the radially outer half of the rubber magnet 31 of the encoder 7, which is further outside in the axial direction than the circular section 33 of the metal core 30, has a circular section 42 and cylindrical section 43 that form an L-shaped cross section. When the double-row tapered-roller bearing unit is assembled and the cylindrical section 32 of the metal core 30 is fitted around and fastened to the shoulder 34 on the axially inside end of the inner race 4, the axially outside surface of the circular section 42 comes close to and faces the axially inside end surface of the outer race 2, and the outer peripheral surface of the cylindrical section 43 comes close to and faces the inner peripheral surface of the axially inside end of the outer race 2. This forms the labyrinth clearance 36 between the bearing space 26 and the detection space 27. With the labyrinth seal made by this kind of labyrinth clearance 36, good seal performance can be obtained since the dimension of this labyrinth clearance 36 in the direction that the grease leaks is long. As a result, it is very effective in preventing a loss of grease inside the bearing space 26, and thus makes it possible to improve the durability of the double-row tapered-roller bearing unit.

Furthermore, in the case of this example, an indented groove 44, which indents outward in the radial direction, is formed all the way around the circumference of part of the inner peripheral surface of the outer race 2 in the area that is adjacent to the axially inside of the large-diameter end of the outer-ring raceway 13a that is on the inside in the axial direction. In other words, the indented groove 44 is formed by making the inner diameter $R_{44}$ of that part in the area adjacent the large-diameter end of the outer-ring raceway 13a larger than the inner diameter $R_2$ of the axially inside end of the outer race 2 ($R_{44} > R_{2a}$). This indented groove 44 catches and holds the grease that is fed out to that part in the area adjacent the large-diameter end of the outer-ring raceway 13a by pumping action that is caused by the orbital motion of the rolling elements 5 located between the outer-ring raceway 13a and second inner-ring raceway 19, and makes it difficult for this grease to reach the labyrinth clearance 36. The grease that is temporarily contained and held in this indented groove 44 drips down to the side of second inner-ring raceway 19 by gravity or vibration that occurs during operation, and lubricates the area of contact between the rolling contact surface of the rolling elements 5 and the rows of outer-ring raceways 13a, 13b and first and second inner-ring raceways 16, 19.

It is preferred that the volume of the indented groove 44 having this function be made somewhat large as long as it is still possible to maintain the strength of the outer race 2 without having to increase the size of the outer race 2. The depth $\{(R_{44} - R_2)/2\}$ is regulated suitably within a range of about 1 to 2 mm in order that strength can be maintained. On the other hand, the width $W_{44}$ in the axial direction is made as large as possible within a range where it is not necessary to increase the size of the outer race 2, and in order to improve the effect of preventing grease leakage it is preferred that this width $W_{44}$ be kept at 2 mm or more. By forming this indented groove 44 into a shape such that it can also serve as a relief groove that is necessary when grinding and polishing the inside outer-ring raceway 13 on the axially inside, processing can be simplified, and it is possible to suppress rising processing costs due to forming the indented groove 44.

In the case of the construction of this example, it is possible to suppress the amount of grease that is lost when grease is pressed out of the double-row roller bearing unit from the bearing space 26 axially inwards by the pumping action caused by the orbital motion of the rolling elements 5. The construction and function of other parts are the same as those described for the second example shown in FIG. 3, so the same code numbers are used for like parts and any redundant explanation is omitted.

INDUSTRIAL APPLICATION

With the rotation-support apparatus with rotation sensor device for drive-wheel of the present invention constructed and functioning as described above, it is possible to reduce the resistance to rotation of the drive wheel and to improve performance of the automobile such as acceleration performance, fuel-consumption performance, and the like.

The invention claimed is:

1. A rotation-support apparatus with rotation sensor device for drive-wheel to be connected to a suspension, comprising:
   a knuckle being part of the suspension and having a support hole and an installation hole formed therein,
   an outer race having axially outside and inside end surfaces and an inner peripheral surface formed with a double row of outer-ring raceways therein, a cylindrical surface section and a chamfered section on the inner peripheral edge of the axially inside end, and fastened to and supported by the knuckle with at least part of the outer race inserted into the support hole,
   a hub having an outer peripheral surface formed with a flange on the axially outside end, to which a vehicle wheel is fastened for supporting, and with a first inner-ring raceway formed directly or by way of a separate inner race in an axially middle section, and a small-diameter stepped section formed on the axially inside end and a spline hole formed in the center,
   an inner race having an outer peripheral surface formed with a second inner-ring raceway and fitted onto the small-diameter section of the hub,
   a plurality of rolling elements located between each of the rows of outer-ring raceways and the first and second inner-ring raceways,
   a constant velocity joint having a spline shaft in an axial outside half thereof and fastened to the hub by a spline joint between the spline shaft and the spline hole such that torque can be transmitted to the hub, and a portion protruding from an axial inside end of the spline hole,
   wherein the portion protruding from both the axial inside end of the spline hole and the axially inside end of the inner race, comprises at least a first cylindrical outer diameter portion which is adjacent to the axial inside end of the spline hole, a second cylindrical outer diameter portion which is located axially inward of the first cylindrical outer diameter portion and has a larger diameter than the first cylindrical outer diameter portion and has a smaller diameter than the inner peripheral diameter of the outer race at the axially inside end, and a bell-shaped outer diameter portion which is located axially inward of the second cylindrical outer diameter portion,
   the constant velocity joint being provided with a gap between the second cylindrical outer diameter portion of the constant velocity joint and the knuckle,
   an encoder fastened to and supported by the axially inside section of the inner race, and having characteristics on the axially inside surface alternately change in the circumferential direction,
   a rotation-detection sensor having a portion projecting radially inwardly from the support hole and having a radially inside end portion, a detection section being formed on the portion projecting radially inwardly, which detection section faces the axially inside surface of the encoder,
   a seal ring located further axially inside than the rotation-detection sensor and having a base end portion which is attached to the support hole of the knuckle and a seal lip which is in sliding contact with the outer periphery of the second cylindrical outer diameter portion to cover the gap between the knuckle and the second cylindrical outer diameter portion of the constant-velocity joint,
   the rotation-detection sensor being inserted into the installation hole in the knuckle so as to be supported by part of the knuckle located further inward in the axial direction than the axially inside end surface of the outer race,
   the projecting portion of the rotation detection sensor being located radially outside of the first cylindrical outer diameter portion and not axially overlapping with the second cylindrical outer diameter portion,
   the radially inside end portion of the rotation detection sensor being located radially inward of the axially inside end of the inner peripheral surface of the outer race, and
   the encoder having an outer peripheral edge extends to the inner cylindrical surface section of the outer race that is further outward in the axial direction than the chamfered section of the outer race, and comes close to and faces the inner peripheral surface of the outer race so as to form a labyrinth seal between the outer race and the encoder.

2. The rotation-support apparatus with rotation sensor device for drive-wheel of claim 1, wherein the encoder is comprised of a metal core made of magnetic metal plate and fitted onto the axially inside end of the inner race for fixing, and a rubber magnet attached to the metal core generally in the circumferential direction, wherein the rubber magnet has N-pole and S-pole in the circumferential direction, such that the S-pole and N-pole are arranged alternately at equal intervals in the circumferential direction on the axially inside surface of the rubber magnet, and wherein at least the axially outside end of the outer peripheral surface of the encoder comes close to and faces the inner peripheral surface on the axially inside end of the outer race generally along the circumference.

3. The rotation-support apparatus with rotation sensor device for drive-wheel of claim 2, wherein the labyrinth seal has a labyrinth clearance of 1 mm or less.

4. The rotation-support apparatus with rotation sensor device for drive-wheel of either of claims 1 and 2, wherein the outer-ring raceways are formed in a tapered concave shape with a larger-inner-diameter end and a smaller-inner-diameter end and arranged with the smaller-inner-diameter ends closer to each other, such that the inner diameter of the respective outer-ring raceways becomes smaller from the larger-inner-diameter end toward the smaller-inner-diameter end, and wherein the first and second inner-ring raceways are formed in a tapered convex shape with a larger-outer-diameter end and smaller-outer-diameter end and arranged with the smaller-outer-diameter ends closer to each other, such that the outer diameter of the respective inner-ring raceways becomes smaller from the larger-outer-diameter end toward the smaller-outer-diameter end, and wherein the rolling elements are tapered roller, and wherein a radially outwardly recessed concave groove is formed in a portion of the inner peripheral surface of the outer race adjacent to the axially inside of the larger-diameter end of the outer-ring raceway on the axially inside.

5. The rotation-support apparatus with rotation sensor device for drive-wheel of claim 4, wherein the labyrinth seal has a labyrinth clearance of 1 mm or less.

6. The rotation-support apparatus with rotation sensor device for drive-wheel of claim 1, wherein the labyrinth seal has a labyrinth clearance of 1 mm or less.

* * * * *